(12) United States Patent
Gotou et al.

(10) Patent No.: US 11,400,932 B2
(45) Date of Patent: Aug. 2, 2022

(54) TARGET VEHICLE SPEED GENERATION METHOD AND TARGET VEHICLE SPEED GENERATION DEVICE FOR DRIVING-ASSISTED VEHICLE

(71) Applicant: Nissan Motor Co., Ltd., Yokohama (JP)

(72) Inventors: Akinobu Gotou, Kanagawa (JP); Takashi Fukushige, Kanagawa (JP); Satoshi Tange, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 240 days.

(21) Appl. No.: 16/617,012

(22) PCT Filed: Jul. 3, 2017

(86) PCT No.: PCT/JP2017/024401
§ 371 (c)(1),
(2) Date: Nov. 26, 2019

(87) PCT Pub. No.: WO2019/008649
PCT Pub. Date: Jan. 10, 2019

(65) Prior Publication Data
US 2021/0276550 A1 Sep. 9, 2021

(51) Int. Cl.
*B60W 30/14* (2006.01)
(52) U.S. Cl.
CPC ....... *B60W 30/143* (2013.01); *B60W 2520/10* (2013.01); *B60W 2520/105* (2013.01);
(Continued)
(58) Field of Classification Search
CPC ............ B60W 30/143; B60W 30/146; B60W 2520/10; B60W 2520/105; B60W 2720/106
See application file for complete search history.

(56) References Cited

U.S. PATENT DOCUMENTS 6,401,024 B1 * 6/2002 Tange ................ B60K 31/0008
180/170
2004/0049333 A1 * 3/2004 Kustosch ............. B60K 31/047
701/93
(Continued)

FOREIGN PATENT DOCUMENTS

DE         19938266 A1 * 2/2001 ............. B60K 28/10
DE       103 58 968 A1    7/2005
(Continued)

OTHER PUBLICATIONS

English translation of DE-102012104069-B3 (2013).*
English translation of DE-19938266-A1 (2001).*

*Primary Examiner* — Anshul Sood
(74) *Attorney, Agent, or Firm* — Global IP Counselors, LLP

(57) ABSTRACT

A target vehicle speed generation device includes a controller for generating a target vehicle speed of a host vehicle in accordance with a speed limit of a travel path of the host vehicle. The controller includes a speed limit information acquisition unit and a target vehicle speed generation unit. The speed limit information acquisition unit acquires the speed limit of the travel path of the host vehicle during travel. The target vehicle speed generation unit generates a target acceleration together with the generation of the target vehicle speed in accordance with the speed limit. The target vehicle speed generation unit has a first acceleration limiter computation unit that, during the generating of the target acceleration, sets an acceleration limiter to increase in a direction of relaxing a limitation on acceleration correspondingly with an increase in the speed limit.

20 Claims, 9 Drawing Sheets

(52) U.S. Cl.
CPC ... *B60W 2554/406* (2020.02); *B60W 2555/60* (2020.02); *B60W 2720/106* (2013.01)

(56) References Cited

U.S. PATENT DOCUMENTS

| | | | |
|---|---|---|---|
| 2014/0088849 A1* | 3/2014 | Ham | B60W 30/143 701/70 |
| 2016/0339912 A1 | 11/2016 | Nakade | |
| 2017/0144660 A1 | 5/2017 | Kagerer et al. | |

FOREIGN PATENT DOCUMENTS

| | | | | |
|---|---|---|---|---|
| DE | 102012104069 B3 * | 3/2013 | ....... | G08G 1/096783 |
| JP | 2000-355232 A | 12/2000 | | |
| JP | 2016-183647 A | 10/2016 | | |
| JP | 2016-215791 A | 12/2016 | | |

\* cited by examiner

TARGET VEHICLE SPEED GENERATION METHOD AND TARGET VEHICLE SPEED GENERATION DEVICE FOR DRIVING-ASSISTED VEHICLE

CROSS-REFERENCE TO RELATED APPLICATIONS

This application is a U.S. national stage application of International Application No. PCT/JP2017/024401, filed on Jul. 3, 2017.

BACKGROUND

Technical Field

The present disclosure relates to a method and device for generating a target vehicle speed of a driving-assisted vehicle, in which a target acceleration/deceleration of a host vehicle is generated in accordance with a speed limit of a travel path of the host vehicle.

BACKGROUND INFORMATION

There are known in the prior art speed-limiting devices for setting an acceleration limit in accordance with a deviation between a speed limit and a host-vehicle speed (for example, see Japanese Laid-Open Patent Application No. 2016-183647).

SUMMARY

However, in the prior-art devices, consideration is given only to deviation between the speed limit and the host-vehicle speed, and not to the actual speed limit. Therefore, it is difficult to achieve a suitable sense of acceleration during travel on high-speed roads having high speed limits and travel in metropolitan areas having low speed limits. Specifically, the same acceleration (speed increase gradient) is set in cases where the deviations between the speed limit and the host-vehicle speed are the same. Therefore, when an acceleration suitable for travel on high-speed roads having high speed limits is set, the acceleration will be excessive during travel in metropolitan areas, and a passenger will experience unpleasant sensations and a traffic flow will be disturbed. Conversely, when an acceleration suitable for travel in metropolitan areas having low speed limits is set, the acceleration will be insufficient during travel on high-speed roads, and a passenger will experience unpleasant sensations and the traffic flow will be disturbed.

The present disclosure was contrived in view of the problem described above, it being an object of the present disclosure to prevent a passenger from experiencing unpleasant sensations while also preventing any disturbance of traffic flows, in correspondence with a variety of roads having different speed limits during driving-assisted travel.

In order to achieve the object described above, the present disclosure is a method for generating a target vehicle speed of a driving-assisted vehicle, in which a target vehicle speed of a host vehicle is generated in accordance with a speed limit of a travel path of the host vehicle. During travel, the speed limit of the travel path of the host vehicle is acquired. A target acceleration is generated together with the generation of the target vehicle speed in accordance with the speed limit. During generation of the target acceleration, an acceleration limit value is set so as to increase in a direction of relaxing a limitation on acceleration correspondingly with respect to an increase in the speed limit.

As indicated above, formulating a vehicle speed plan derived from acceleration characteristics that correspond to a speed limit of a travel path of a host vehicle makes it possible to prevent a passenger from experiencing unpleasant sensations while also preventing any disturbance of traffic flows, in correspondence with a variety of roads having different speed limits during driving-assisted travel.

DETAILED DESCRIPTION OF THE EMBODIMENTS

Figure 1:
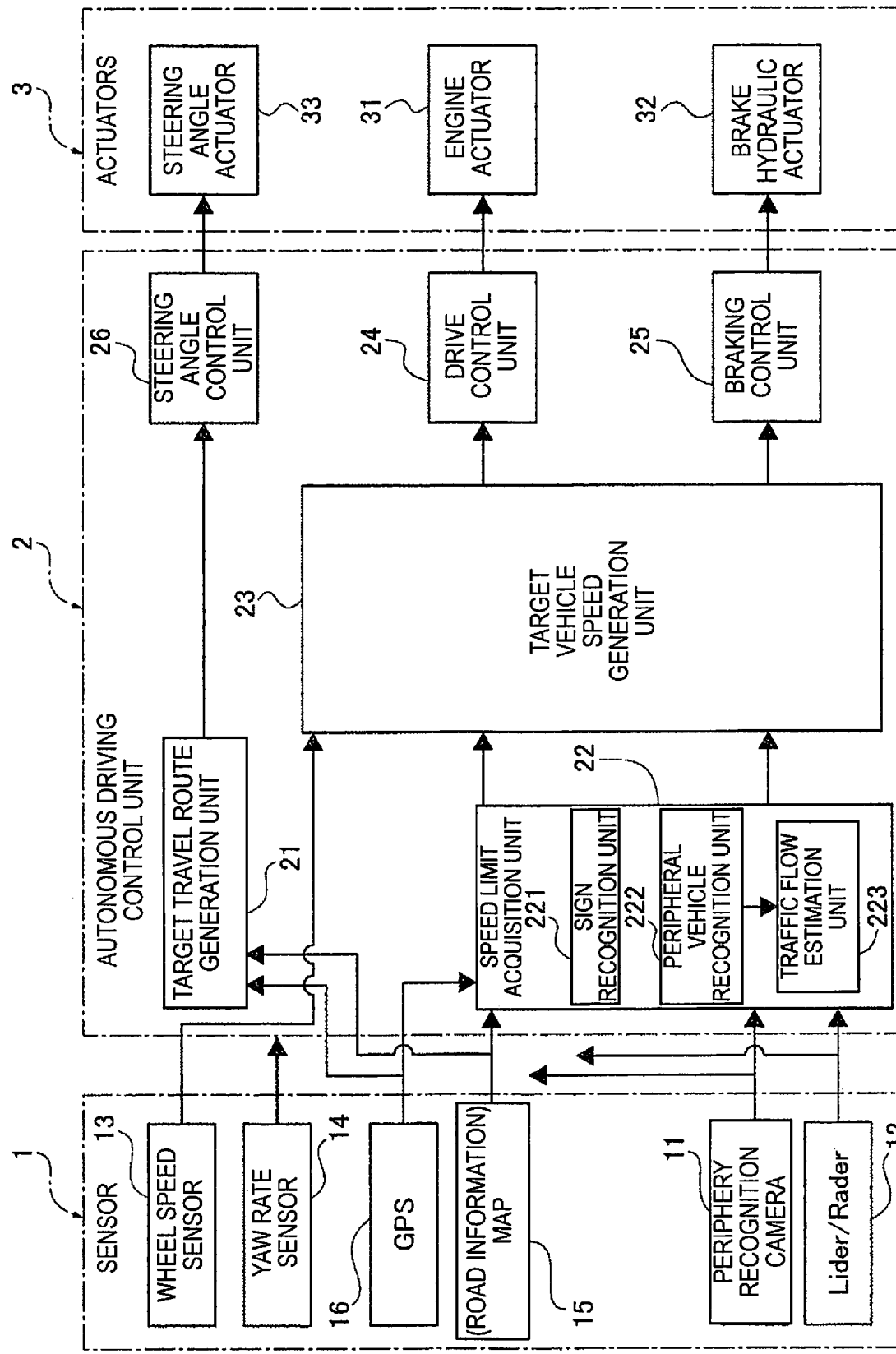
FIG. 1 is an overall system diagram showing an autonomous driving control system to which a method and device for generating a target vehicle speed in the first embodiment are applied.

A preferred embodiment for realizing a method and device for generating a target vehicle speed of a driving-assisted vehicle according to the present disclosure is described below on the basis of the first embodiment shown in the drawings.

First Embodiment

First, a configuration is described. The method and device for generating a target vehicle speed in the first embodiment are applied to an autonomous driving vehicle (one example of a driving-assisted vehicle) in which generated target acceleration information is used in speed control and steering/drive/braking are autonomously controlled through selection of an autonomous driving mode. The configuration in the first embodiment is described below, and specifically is divided into "Overall system configuration" and "Detailed configuration of target vehicle speed generation unit."

Overall System Configuration

FIG. 1 is an overall system diagram showing an autonomous driving control system to which the method and device for generating a target vehicle speed in the first embodiment are applied. The overall system configuration is described below on the basis of FIG. 1.

The autonomous driving control system comprises sensors 1, an autonomous driving control unit 2, and actuators 3, as shown in FIG. 1. The autonomous driving control unit 2 comprises a CPU or another such arithmetic processing device, and moreover is a computer that executes arithmetic processing.

The sensors 1 include a periphery recognition camera 11, a lidar/radar 12, a wheel speed sensor 13, a yaw rate sensor 14, a map 15, and a GPS 16.

The periphery recognition camera 11 is, e.g., an onboard imaging device comprising a CCD or other imaging element, the periphery recognition camera 11 being installed at a prescribed position on a host vehicle and capturing images of objects in the periphery of the host vehicle. The periphery recognition camera 11 detects obstacles on a travel path of the host vehicle, obstacles that are outside of the travel path of the host vehicle (road structures, preceding vehicles, following vehicles, oncoming vehicles, peripheral vehicles, pedestrians, bicycles, and motorcycles), the travel path of the host vehicle (white road lines, road boundaries, stop lines, pedestrian crossings), road signs (vehicle speed limits), etc. A plurality of onboard cameras may be combined to form the periphery recognition camera 11.

The lidar/radar 12 is a ranging sensor, and any form of ranging sensor that is known at the time of application, such as a laser radar, a millimeter wave radar, an ultrasonic radar, or a laser range finder, can be employed therefor. The lidar/radar 12 detects obstacles on the travel path of the host vehicle, obstacles that are outside of the travel path of the host vehicle (road structures, preceding vehicles, following vehicles, oncoming vehicles, peripheral vehicles, pedestrians, bicycles, and motorcycles), etc. If a viewing angle is insufficient, the vehicle may be equipped with a plurality of units. A lidar (ranging sensor that emits light) and a radar (ranging sensor that emits electromagnetic waves) may also be combined.

A wheel speed sensor 13 is provided to each of four wheels. The wheel speed sensors 13 detect a wheel speed of each wheel. An average value of the wheel speeds of left and right driven wheels is used as a detected value of the vehicle speed at a current point in time.

The yaw rate sensor 14 is an attitude sensor that detects a yaw rate of the vehicle (an angular velocity of rotation about a vertical axis passing through a center of gravity of the vehicle). Attitude sensors encompass gyroscope sensors, which can detect a pitch angle, a yaw angle, and a roll angle of a vehicle.

The map 15 is a so-called digital map, and is information that associates latitude/longitude and cartographic information. The map 15 includes road information that has been associated with respective points. The road information is defined by nodes and links that connect nodes together. The road information includes information that specifies roads according to road position/area, and information indicating a type of each road, a width of each road, and road geometry. The position of intersections, the directions of approach for intersections, intersection type, and other information relating to intersections is stored in association with respective identification information for each road link in the road information. Road type, road width, road geometry, whether forward progress is permitted, right-of-way relationships, whether passing is permitted (whether entering an adjacent lane is permitted), vehicle speed limit, and other information relating to roads is also stored in association with respective identification information for each road link in the road information.

The GPS 16 (short for "global positioning system") detects a travel position (latitude and longitude) of the host vehicle during travel.

The autonomous driving control unit 2 comprises a target travel route generation unit 21, a speed limit information acquisition unit 22, a target vehicle speed generation unit 23, a drive control unit 24, a braking control unit 25, and a steering angle control unit 26.

The target travel route generation unit 21 receives information from the peripheral recognition camera 11, the lidar/radar 12; the map 15, and the GPS 16 as input and generates a target travel route of the host vehicle.

The speed limit information acquisition unit 22 receives information from the peripheral recognition camera 11, the lidar/radar 12, the map 15, and the GPS 16 as input and acquires speed limit information. The speed limit information acquisition unit 22 has a sign recognition unit 221 for recognizing speed limit signs, a peripheral vehicle recognition unit 222 for recognizing a vehicle in the periphery of the host vehicle, and a traffic flow estimation unit 223 for estimating a traffic flow according to a movement speed of the vehicle in the periphery of the host vehicle.

The speed limit information about the road on which the host vehicle is traveling is acquired through the following steps (a1) to (d1).

(a1) A default speed limit derived by recognition of a road sign by the sign recognition unit 221 is acquired as the speed limit.

(b1) A default speed limit derived using prior information from map data is acquired as the speed limit.

(c1) When it is impossible to acquire the speed limit from road signs or from the map data, the traffic flow estimation unit 223 estimates the traffic flow on the basis of a plurality of items of peripheral vehicle position information obtained from the peripheral vehicle recognition unit 222. A speed determined as a speed at which it is possible to travel without significantly departing from the traffic flow, on the basis of the estimated traffic flow, is acquired as the speed limit.

(d1) When a plurality of speed limits have been acquired simultaneously from road signs and from the map data, the lowest value of the plurality of speed limits is selected as the speed limit.

The target vehicle speed generation unit 23 receives the speed limit information from the speed limit information acquisition unit 22 and speed information from the wheel speed sensors 13 as inputs and generates a target vehicle speed of the host vehicle. In the "target vehicle speed generation unit 23," the target vehicle speed is generated in accordance with the actual speed of the host vehicle and the speed limit of the road on which the host vehicle is traveling, and a target acceleration and a target deceleration are generated.

The drive control unit 24 receives the target vehicle speed and the target acceleration from the target vehicle speed generation unit 23 as inputs, derives a drive control command value according to a speed servo control, and outputs a derivation result to an engine actuator 31.

The braking control unit 25 receives the target vehicle speed and the target deceleration from the target vehicle speed generation unit 23 as input, derives a braking control command value according to the speed servo control, and outputs a derivation result to a brake hydraulic actuator 32.

As a method of deriving a control command value using vehicle speed servo control, for example, feedforward control+feedback control, which combines feedforward control that corresponds to the target rate of acceleration/deceleration and feedback control that corresponds to a difference between the target vehicle speed and the current vehicle speed, is performed. Deviation from a target value due to road gradients or the like should also be taken into account when this is performed.

The steering angle control unit 26 receives the target travel route information from the target travel route generation unit 21 as input and determines a target steering angle so that the host vehicle follows the target travel route of the host vehicle. The steering angle control unit 26 also derives a steering angle control command value so that an actual steering angle matches the target steering angle, and outputs a derivation result to a steering angle actuator 33.

The actuators 3 include the engine actuator 31, the brake hydraulic actuator 32, and the steering angle actuator 33.

The engine actuator 31 is an actuator that receives the drive control command value from the drive control unit 24 as input and controls engine drive force. In the case of a hybrid vehicle, an engine actuator and a motor actuator may be used together. In the case of an electric autonomous vehicle, a motor actuator may be used.

The brake hydraulic actuator 32 is a hydraulic booster that receives the braking control command value from the braking control unit 25 as input and controls brake hydraulic braking force. In the case of an electric-powered vehicle not equipped with a hydraulic booster, an electric-powered booster may be used.

The steering angle actuator 33 is a steering angle control motor that receives the steering angle control command value from the steering angle control unit 26 as input and controls a steering angle of a steering wheel.

Detailed Configuration of Target Vehicle Speed Generation Unit

Figure 2:
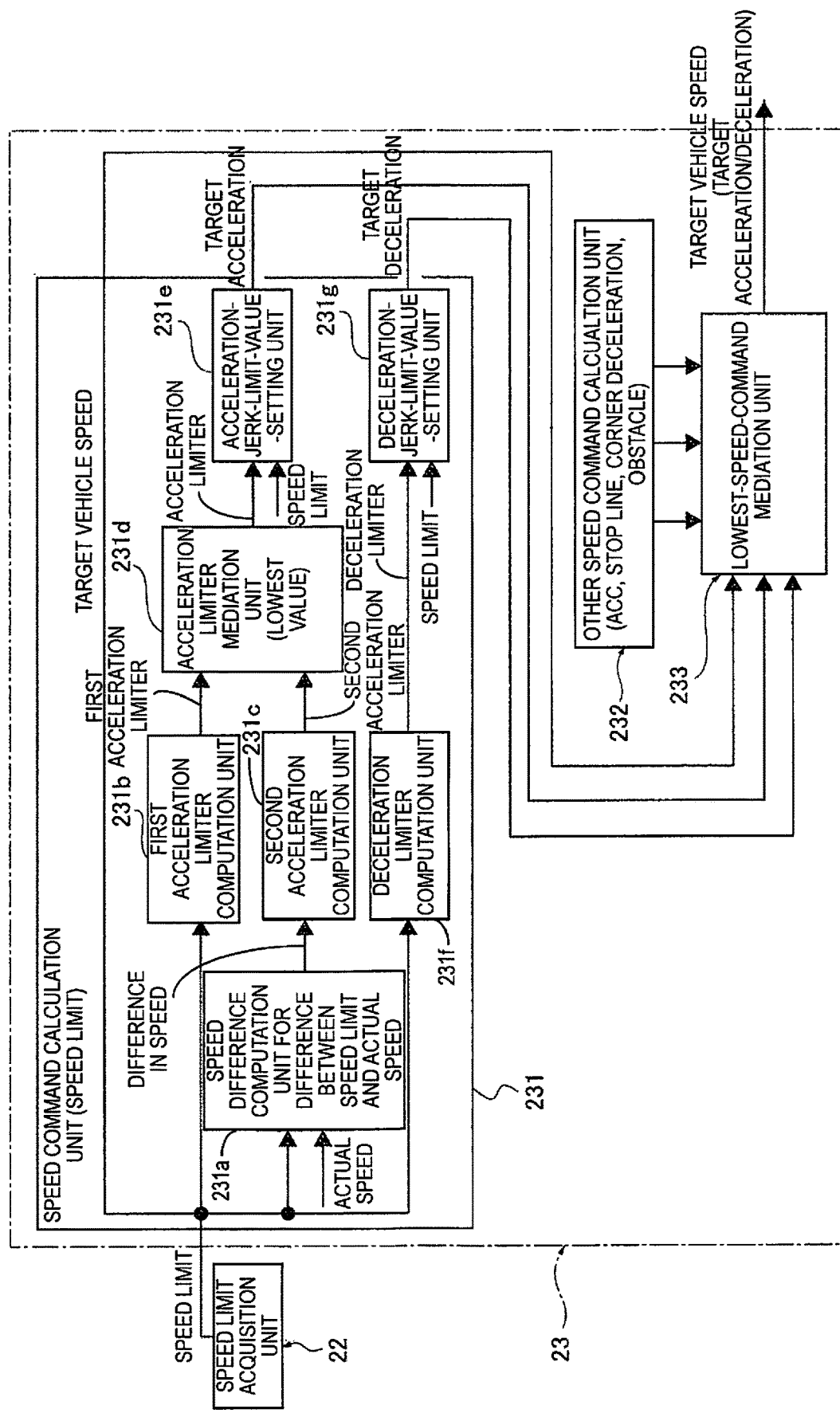
FIG. 2 is a block diagram showing a detailed configuration of a target vehicle speed generation unit in the method and device for generating a target vehicle speed in the first embodiment.

FIG. 2 shows a detailed configuration of the target vehicle speed generation unit 23 in the device for generating a target vehicle speed in the first embodiment. The detailed configuration of the target vehicle speed generation unit 23 provided to the autonomous driving control unit 2 is described below on the basis of FIG. 2.

The target vehicle speed generation unit 23 comprises a speed command calculation unit 231 (speed limit), another speed command calculation unit 232, and a lowest-speed-command mediation unit 233, as shown in FIG. 2.

The speed command calculation unit 231 receives the speed limit from the speed limit acquisition unit 22 and the actual speed from the wheel speed sensors 13 as inputs and generates a target vehicle speed (equal to the speed limit), a target acceleration, and a target deceleration. Specifically, when the speed limit is selected as a final target vehicle speed, the speed limit derived from a fixed value is set as the target vehicle speed while the speed limit of the road on which the host vehicle is traveling does not change, and both the target acceleration and the target deceleration are set to zero. However, a target acceleration is generated in a transition period during which the speed limit transitions from a low speed to a high speed, and conversely, a target deceleration is generated in a transition period during which the speed limit transitions from a high speed to a low speed. In addition, when the final target vehicle speed has switched from a target vehicle speed derived from a category other than the speed limit to a target vehicle speed derived from the speed limit, a target acceleration is generated in a transition period during which the target vehicle speed increases, and conversely, a target deceleration is generated in a transition period during which the target vehicle speed decreases.

The speed command calculation unit 231 has a speed difference computation unit 231a that computes the difference between the speed limit and the actual speed, a first acceleration limiter computation unit 231b, a second acceleration limiter computation unit 231c, an acceleration limiter mediation unit 231d, an acceleration-jerk-limit-value-setting unit 231e, a deceleration limiter computation unit 231f, and a deceleration-jerk-limit-value-setting unit 231g.

The speed difference computation unit 231a computes a difference in speed between the speed limit and the host-vehicle speed.

The first acceleration limiter computation unit 231b (acceleration-limit-value-setting unit) sets a first acceleration limiter (first acceleration limit value) to increase in a direction of relaxing a limitation on acceleration correspondingly with an increase in the speed limit when the target acceleration is generated on the basis of the speed limit. Specifically, when the first acceleration limiter is high, a target acceleration having a steep gradient of vehicle speed increase is generated, and when the first acceleration limiter is low, a target acceleration having a gradual gradient of vehicle speed increase is generated.

The second acceleration limiter computation unit 231c (acceleration-limit-value-setting unit) sets a second acceleration limiter (second acceleration limit value) to increase in a direction of relaxing a limitation on acceleration correspondingly with an increase in the difference in speed from the speed difference computation unit 231a. Specifically, when the difference in speed is high, a target acceleration having a steep gradient of vehicle speed increase is generated, and when the difference in speed is low, a target acceleration having a gradual gradient of vehicle speed increase is generated.

The acceleration limiter mediation unit 231d selects one of the first acceleration limiter from the first acceleration limiter computation unit 231b and the second acceleration limiter from the second acceleration limiter computation unit 231c, specifically selecting whichever of the acceleration limiters is lower. The acceleration limiter mediation unit 231d then sets the limiter value selected according to selection of the lowest value as a final acceleration limiter (acceleration limit value).

The acceleration-jerk-limit-value-setting unit 231e sets an acceleration jerk limit value to increase in a direction of relaxing a limitation on acceleration jerk correspondingly with an increase in the speed limit. The acceleration-jerk-limit-value-setting unit 231e receives the acceleration limiter (acceleration limit value) from the acceleration limiter mediation unit 231d as input and outputs, as the target acceleration, a value such that a change over time in acceleration (acceleration jerk) of the acceleration limiter is suppressed.

The deceleration limiter computation unit 231f (deceleration-limit-value-setting unit) sets a deceleration limiter (deceleration limit value) to increase in a direction of relaxing a limitation on deceleration correspondingly as the speed limit decreases. Specifically, when the deceleration limiter is high, a target deceleration having a steep gradient of vehicle speed decrease is generated, and when the deceleration limiter is low, a target deceleration having a gradual gradient of vehicle speed decrease is generated.

The deceleration-jerk-limit-value-setting unit 231g sets a deceleration jerk limit value to increase in a direction of relaxing a limitation on deceleration jerk correspondingly with a decrease in the speed limit. The deceleration-jerk-limit-value-setting unit 231g receives the deceleration limiter (deceleration limit value) from the deceleration limiter computation unit 231f as input and outputs, as the target deceleration, a value such that a change over time in deceleration (deceleration jerk) of the deceleration limiter is suppressed.

The other speed command calculation unit 232 calculates a speed command value differing in category from that of the speed command calculation unit 231 (speed limit). For example, the other speed command calculation unit 232 creates a speed profile corresponding to adaptive cruise control (ACC) on the basis of the ACC and calculates a speed command value (ACC) according to the created speed profile. As another example, the other speed command calculation unit 232 creates a speed profile corresponding to a stop line on the basis of a stop line in front of the host vehicle and calculates a speed command value (stop line) according to the created speed profile. As yet another example, the other speed command calculation unit 232 creates a speed profile corresponding to corner deceleration on the basis of a tight corner in front of the host vehicle and calculates a speed command value (corner deceleration) according to the created speed profile. As a further example, the other speed command calculation unit 232 creates a speed profile corresponding to an obstacle on the basis of an obstacle present on the travel route of the host vehicle and calculates a speed command value (obstacle) according to the created speed profile.

The lowest-speed-command mediation unit 233 selects, as a target vehicle speed, the lowest value from among a plurality of speed command values calculated by the speed command calculation unit 231 and the other speed command calculation unit 232. In addition to selecting the lowest value as the target vehicle speed, the lowest-speed-command mediation unit 233 simultaneously selects a target acceleration/deceleration that corresponds to the type of the selected target vehicle speed. Specifically, when the speed command value calculated by the speed command calculation unit 231 (speed limit) is selected by the lowest-speed-command mediation unit 233, the target vehicle speed (speed limit) and the target acceleration/deceleration are generated on the basis of the speed limit of the road on which the host vehicle is traveling.

The operation of the invention is described next. The operation in the first embodiment is described below, and specifically is divided into "Operation for acceleration characteristic control process," "Operation for deceleration characteristic control process," "Problem in a comparative example," "Operation for acceleration characteristic control," and "Operation for deceleration characteristic control."

Operation for Acceleration Characteristic Control Process

Figure 3:
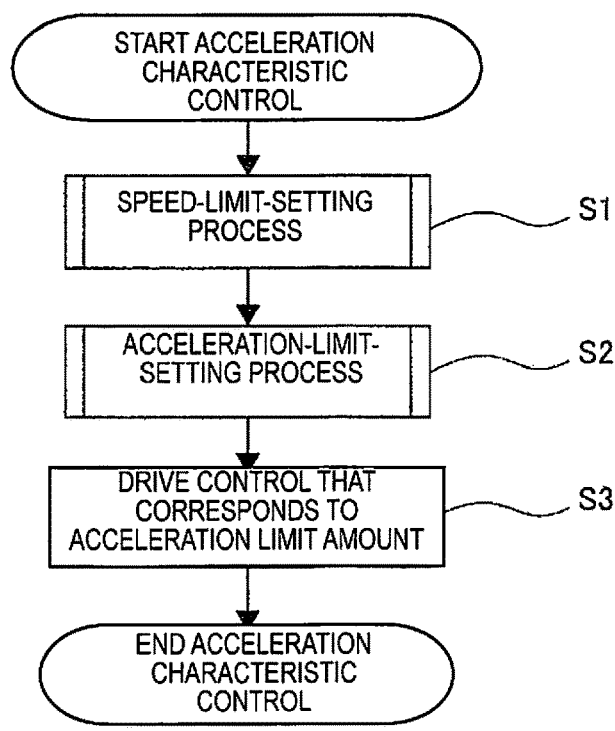
FIG. 3 is a flow chart showing a flow of an acceleration characteristic control process executed by an autonomous driving control unit in the first embodiment.
Figure 4:
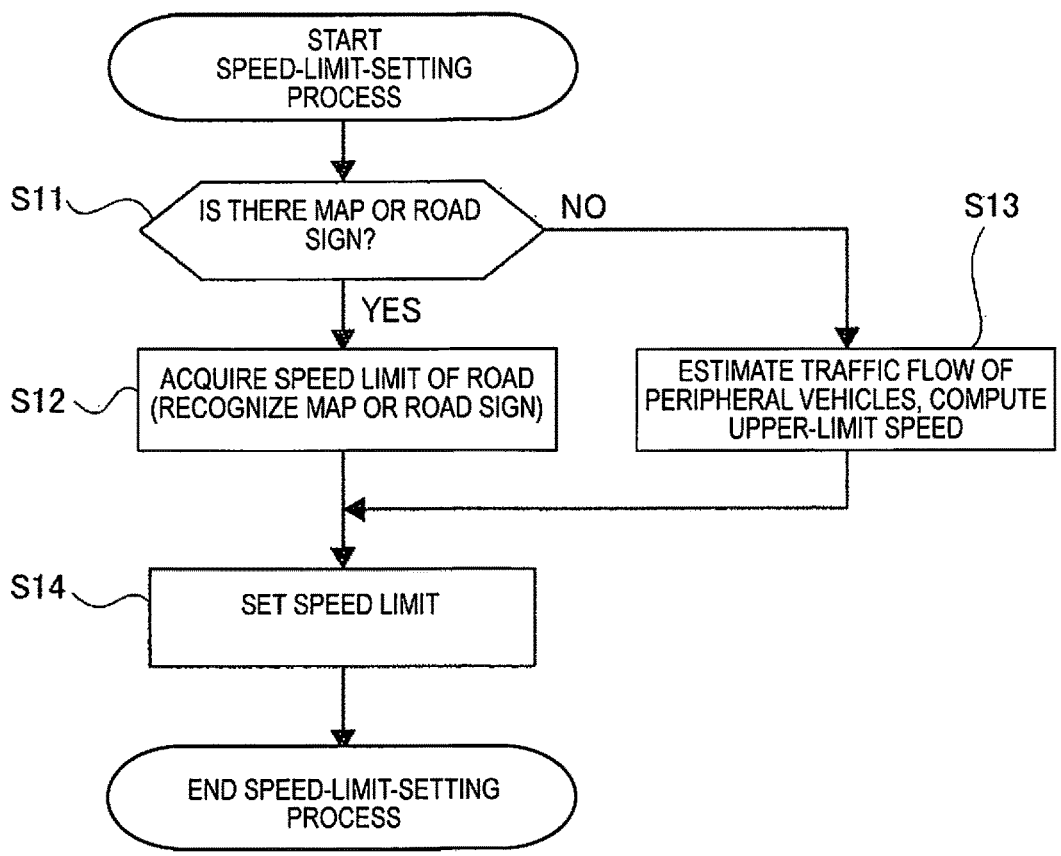
FIG. 4 is a flow chart showing a flow of a speed-limit-setting process in step S2 of the flow chart shown in FIG. 3.
Figure 5:
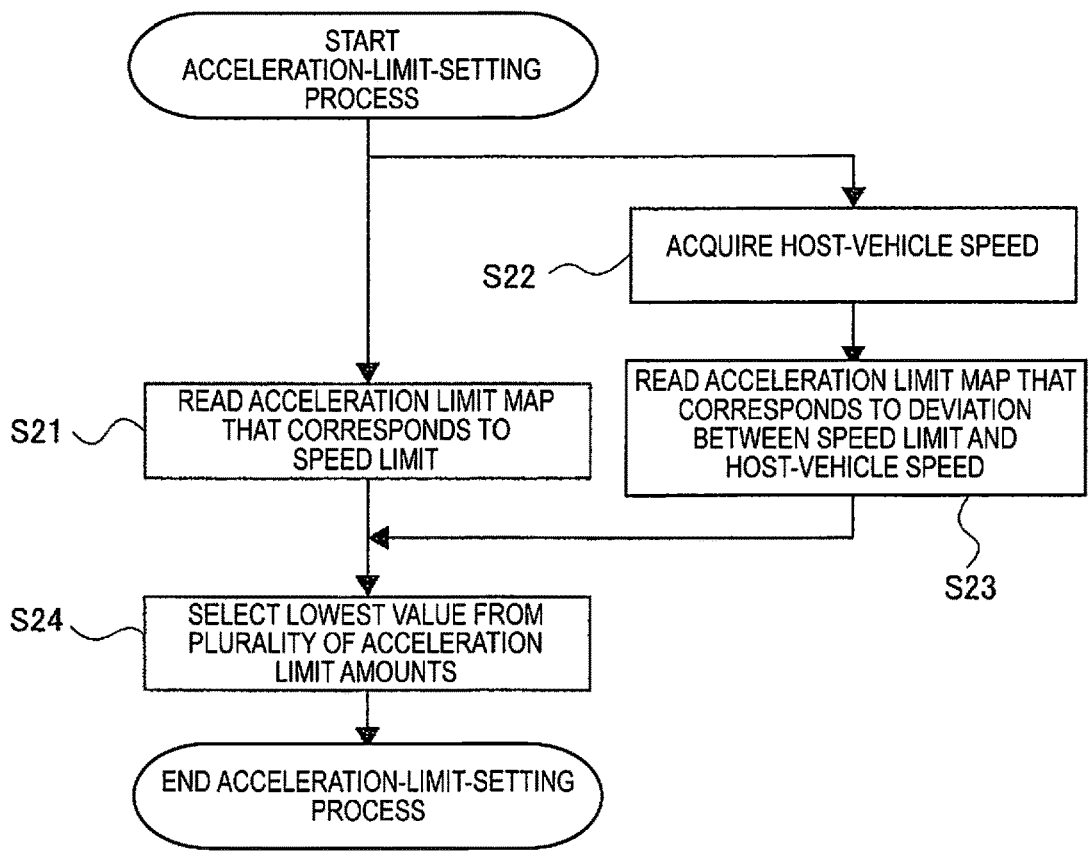
FIG. 5 is a flow chart showing a flow of an acceleration-limit-setting process in step S3 of the flow chart shown in FIG. 3.

FIG. 3 shows a flow of an acceleration characteristic control process executed by the autonomous driving control unit 2 in the first embodiment. FIG. 4 shows a flow of a speed-limit-setting process in step S2 of the flow chart shown in FIG. 3. FIG. 5 shows a flow of an acceleration-limit-setting process in step S3 of the flow chart shown in FIG. 3. An operation for the acceleration characteristic control process is described below on the basis of FIGS. 3 to 8.

Steps shown in FIG. 3 are described below. Upon the initiating of an acceleration characteristic control, a speed-limit-setting process (FIG. 4) is executed in step S1, and the process advances to step S2. In step 2, following from the setting in step S1 of the speed limit, an acceleration-limit-setting process (FIG. 5) is executed, and the process advances to step S3. In step S3, following from the setting in step S2 of the acceleration limit, a drive control that corresponds to the acceleration limit amount is executed, and the acceleration characteristic control is terminated.

Thus, in the acceleration characteristic control when the speed limit of the road on which the host vehicle is traveling increases, following from the speed-limit-setting process (FIG. 4), the acceleration-limit-setting process (FIG. 5) is executed on the basis of the speed limit, and the target acceleration is generated. When the speed limit of the road on which the host vehicle is traveling increases, a drive control is executed to obtain the generated target acceleration, whereby accelerated travel derived from acceleration characteristics that are limited on the basis of the speed limit is achieved.

An operation for a speed-limit-setting process in step S1 shown in FIG. 3, which is executed by the speed limit information acquisition unit 22, is described next according to the flow chart shown in FIG. 4.

In step S11, upon the initiating of the speed-limit-setting process, it is determined whether or not there is a map or sign from which it is possible to acquire the speed limit. If YES (there is a map or sign), the process advances to step S12; if NO (there is no map or sign), the process advances to step S13.

In step S12, following from the determination in step S11 that there is a map or sign, the speed limit of the road on which the host vehicle is traveling is acquired from the map or sign, and the process advances to step S14.

In step S13, following from the determination in step S11 that there is no map or sign, the traffic flow of peripheral vehicles is estimated, an upper-limit speed at which the host vehicle can travel along with the traffic flow is computed, and the process advances to step S14.

In step S14, following from the acquisition in step S12 of the speed limit, or following from the computation in step S13 of the upper-limit speed, the speed limit of the road on which the host vehicle is traveling is set, and the speed-limit-setting process is terminated. When two speed limits are acquired in step S12 from the map and the sign, the lowest speed is set as the speed limit. When the upper-limit speed is computed in step S13, the upper-limit speed is used as the speed limit.

Thus, during the acquiring of the speed limit, when the speed limit is acquired from the map or sign, the acquired speed limit is used in an unchanged state as the speed limit information. When no speed limit is acquired from the map or sign, the traffic flow of peripheral vehicles is estimated and the upper-limit speed computed as the speed at which the host vehicle can travel along with the traffic flow is used as the speed limit information. When two speed limits are acquired from the map and the sign, the lowest speed is used as the speed limit information.

The acceleration-limit-setting process in step S2 shown in FIG. 3, which is executed by the speed difference computation unit 231a, the first acceleration limiter computation unit 231b, the second acceleration limiter computation unit 231c, and the acceleration limiter mediation unit 231d, is described next according to the flow chart shown in FIG. 5.

Figure 6:
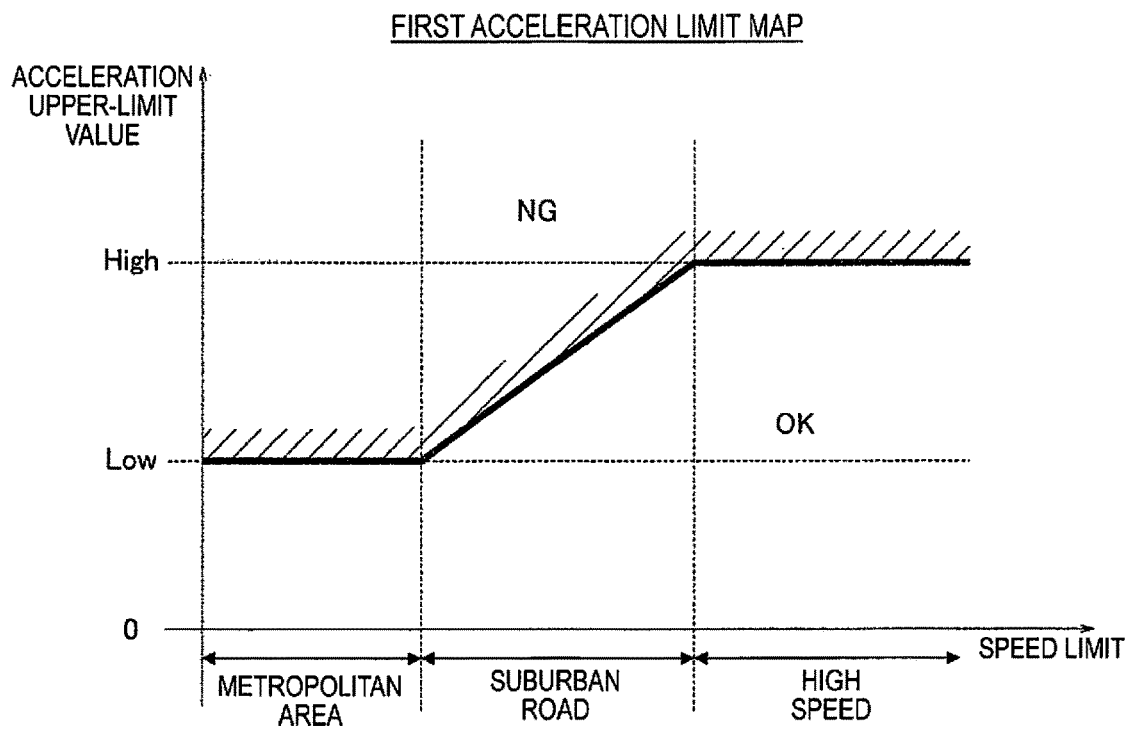
FIG. 6 is a map diagram showing one example of a first acceleration limit map used in the acceleration-limit-setting process.

In step S21, upon the initiating of the acceleration-limit-setting process, the first acceleration limit map shown in FIG. 6 is read, an acceleration upper-limit value that corresponds to a speed limit is determined using the first acceleration limit map, and the process advances to step S24. In the first acceleration limit map, as shown in FIG. 6, the acceleration upper-limit value is set to a low value during travel in metropolitan areas having low speed limits, and is set to a high value during travel on high-speed roads having high speed limits. During travel on suburban roads where the speed limit changes from a low speed to a high speed, the acceleration upper-limit value is set to a variable value linking the low value and the high value.

In step S22, upon the initiating of the acceleration-limit-setting process, the host-vehicle speed is acquired, and the process advances to step S23.

Figure 7:
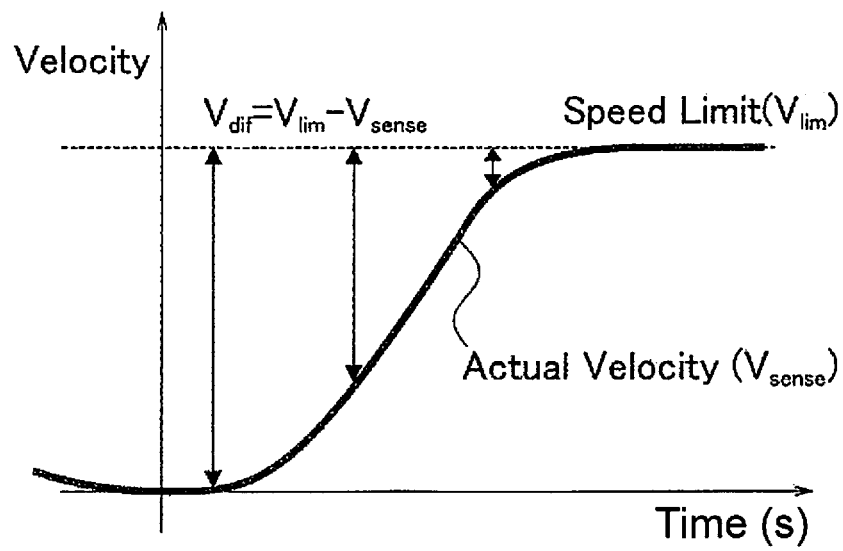
FIG. 7 is a speed difference diagram showing a speed difference between a speed limit and an actual speed.
Figure 8:
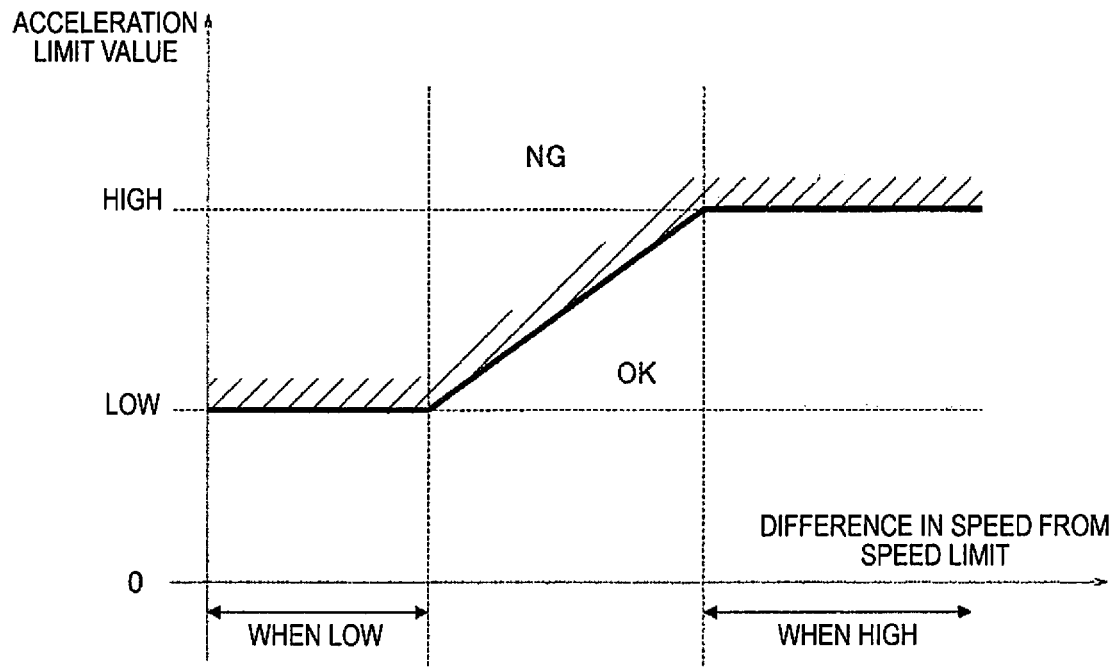
FIG. 8 is a map diagram showing one example of a second acceleration limit map used in the acceleration-limit-setting process.

In step S23, following from the acquisition in step S22 of the host-vehicle speed, the second acceleration limit map shown in FIG. 8 is read, a deviation (difference in speed) between the speed limit and the host-vehicle speed is computed, an acceleration limit value is determined according to the difference in speed using the second acceleration limit map, and the process advances to step S24. A difference in speed $V_{dif}$ is computed according to a formula in which a host-vehicle speed $V_{sense}$ is subtracted from a speed limit $V_{lim}$ (i.e., $V_{dif}=V_{lim}-V_{sense}$), as shown in FIG. 7. In the second acceleration limit map, as shown in FIG. 8, the acceleration limit value is set to a high value in a region in which the difference in speed $V_{dif}$ is high, and is set to a low value in a region in which the difference in speed $V_{dif}$ is low. In a region of transition from a region having a high difference in speed $V_{dif}$ to a region having a low difference in speed $V_{dif}$, the acceleration limit value is set to a variable value lining the high value and the low value.

In step S24, following from step S21 and step S23, the lowest value of a plurality of acceleration limit amounts is selected, a value obtained by the selection of the lowest value is used as a final acceleration limit value, and the acceleration-limit-setting process is terminated.

Thus, in the control for limiting the upper limit of acceleration, a value obtained by selection of the lowest value from among the acceleration upper-limit value determined in accordance with the speed limit and the acceleration limit value determined in accordance with the difference in speed $V_{dif}$ is used as the final acceleration limit value.

Accordingly, when the acceleration upper-limit value determined in accordance with the speed limit is used as the final acceleration limit value, the acceleration is limited in the following manner according to the first acceleration limit map shown in FIG. 6.

(a2) During travel in metropolitan areas having low speed limits, the acceleration is strictly limited.

(b2) During travel on high-speed roads having high speed limits, the limitation on acceleration is relaxed.

(c2) During travel on suburban roads having intermediate speed limits, the limitation on acceleration is relaxed correspondingly with an increase in the speed limit.

When the acceleration limit value determined in accordance with the difference in speed $V_{dif}$ is used as the final acceleration limit value, the acceleration is limited in the following manner according to the second acceleration limit map shown in FIG. 8.

(a3) When the difference in speed $V_{dif}$ is low, the acceleration is strictly limited.

(b3) When the difference in speed $V_{dif}$ is high, the limitation on acceleration is relaxed.

(c3) When the difference in speed $V_{dif}$ is intermediate, the limitation on acceleration is relaxed correspondingly with an increase in the difference in speed $V_{dif}$.

Operation for Deceleration Characteristic Control Process

Figure 9:
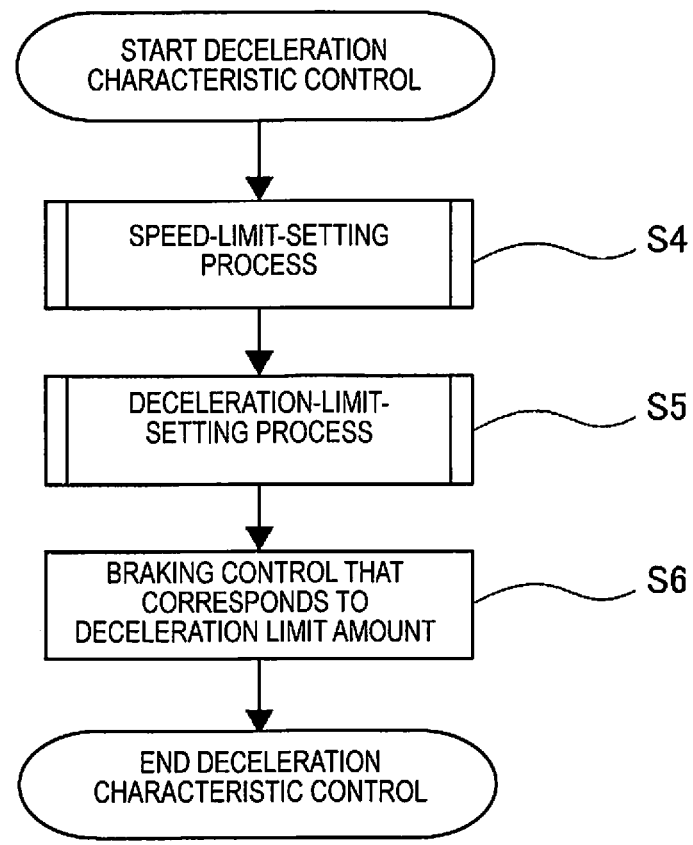
FIG. 9 is a flow chart showing a flow of a deceleration characteristic control process executed by the autonomous driving control unit in the first embodiment.
Figure 10:
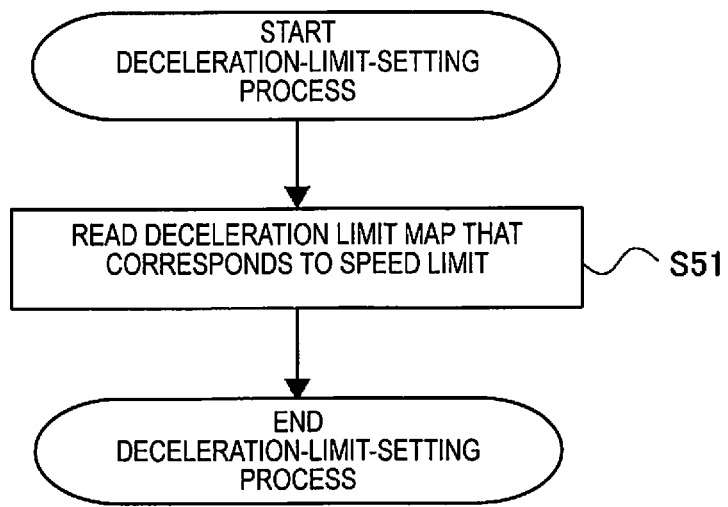
FIG. 10 is a flow chart showing a flow of a deceleration-limit-setting process in step S5 of the flow chart shown in FIG. 9.

FIG. 9 shows a flow of a deceleration characteristic control process executed by the autonomous driving control unit 2 in the first embodiment. FIG. 10 shows a flow of a deceleration-limit-setting process in step S5 of the flow chart shown in FIG. 9. An operation for the deceleration characteristic control process is described below on the basis of FIGS. 9 to 11.

Steps shown in FIG. 9 are described below. Upon the initiating of a deceleration characteristic control, a speed-limit-setting process (FIG. 4) is executed in step S4, and the process advances to step S5. In step S5, following from the setting in step S4 of the speed limit, a deceleration-limit-setting process (FIG. 10) is executed, and the process advances to step S6. In step S6, following from the setting in step S5 of the deceleration limit, a braking control that corresponds to the deceleration limit amount is executed, and the deceleration characteristic control is terminated.

The speed-limit-setting process in step S4 shown in FIG. 9, which is executed by the speed limit information acquisition unit 22, is executed according to the flow chart shown in FIG. 4 in regard to the operation for the acceleration characteristic control process, and therefore description of the speed-limit-setting process is omitted here.

An operation for a deceleration-limit-setting process in step S5 shown in FIG. 9, which is executed by the deceleration limiter computation unit 231f, is described according to the flow chart shown in FIG. 10.

Figure 11:
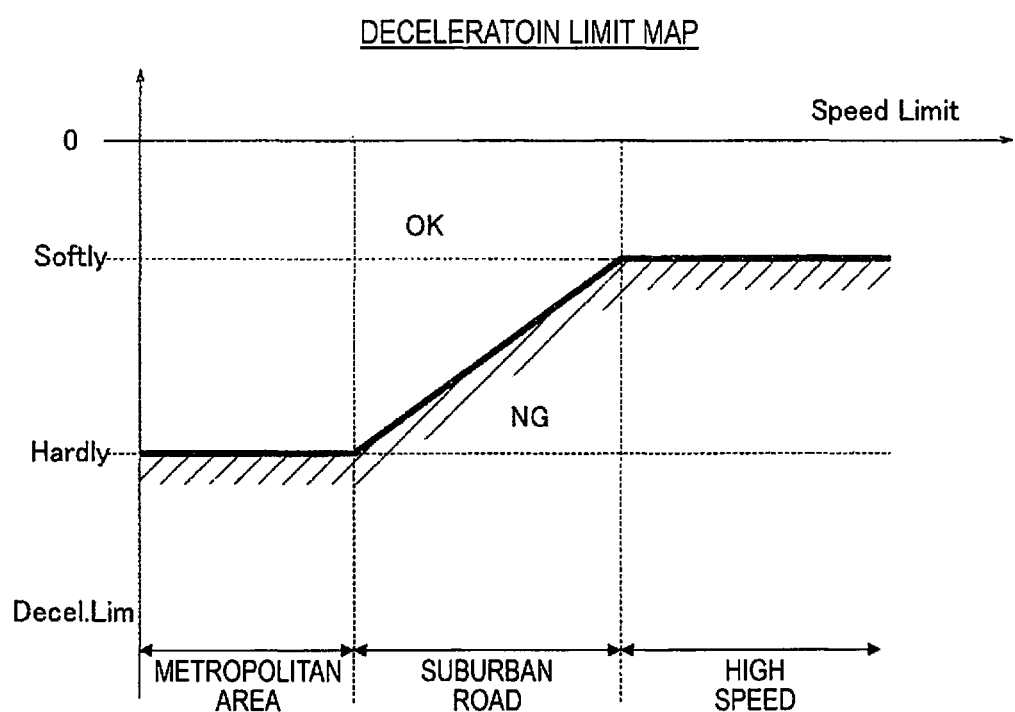
FIG. 11 is a map diagram showing one example of a deceleration limit map used in the deceleration-limit-setting process.

In step S51, upon the initiating of a deceleration-limit-setting process, the deceleration limit map shown in FIG. 11 is read, a deceleration limit value that corresponds to the speed limit is determined using the deceleration limit map, and the deceleration-limit-setting process is terminated. In the deceleration limit map, as shown in FIG. 11, the deceleration limit value is set to a high value for accommodating a high deceleration during travel in metropolitan areas having low speed limits, and is set to a low value for limiting by a small deceleration during travel on high-speed roads having high speed limits. During travel on suburban roads where the speed limit changes from a low speed to a high speed, the deceleration limit value is set to a variable value linking the high value and the low value.

Thus, in the control for limiting the upper limit of deceleration, the deceleration limit value determined in accordance with the speed limit is used.

Accordingly, the deceleration is limited in the following manner according to the deceleration limit map shown in FIG. 11.

(a4) During travel in metropolitan areas having low speed limits, the deceleration limit is relaxed.

(b4) During travel on high-speed roads having high speed limits, the deceleration is strictly limited.

(c4) During travel on suburban roads having intermediate speed limits, the limitation on deceleration is made stricter correspondingly with an increase in the speed limit.

Problem in a Comparative Example

Figure 12:
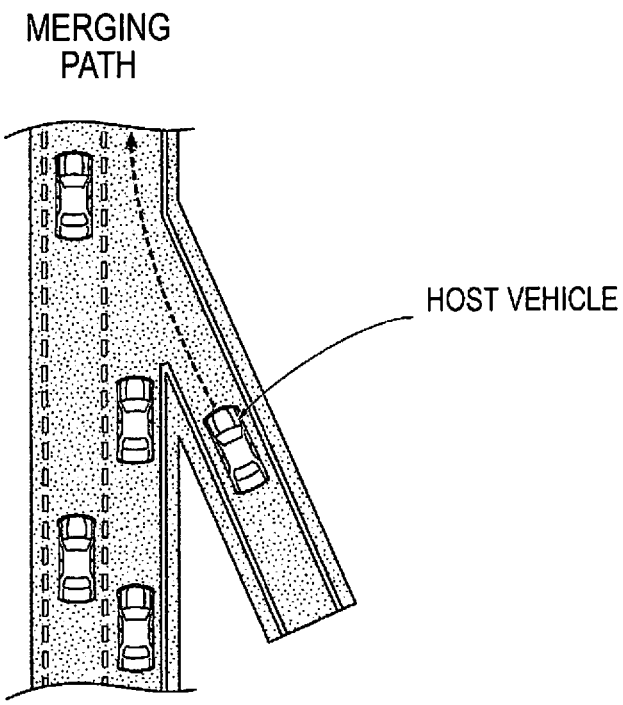
FIG. 12 is an operation schematic diagram showing a merge operation on a path merging from a typical road to a high-speed road.
Figure 13:
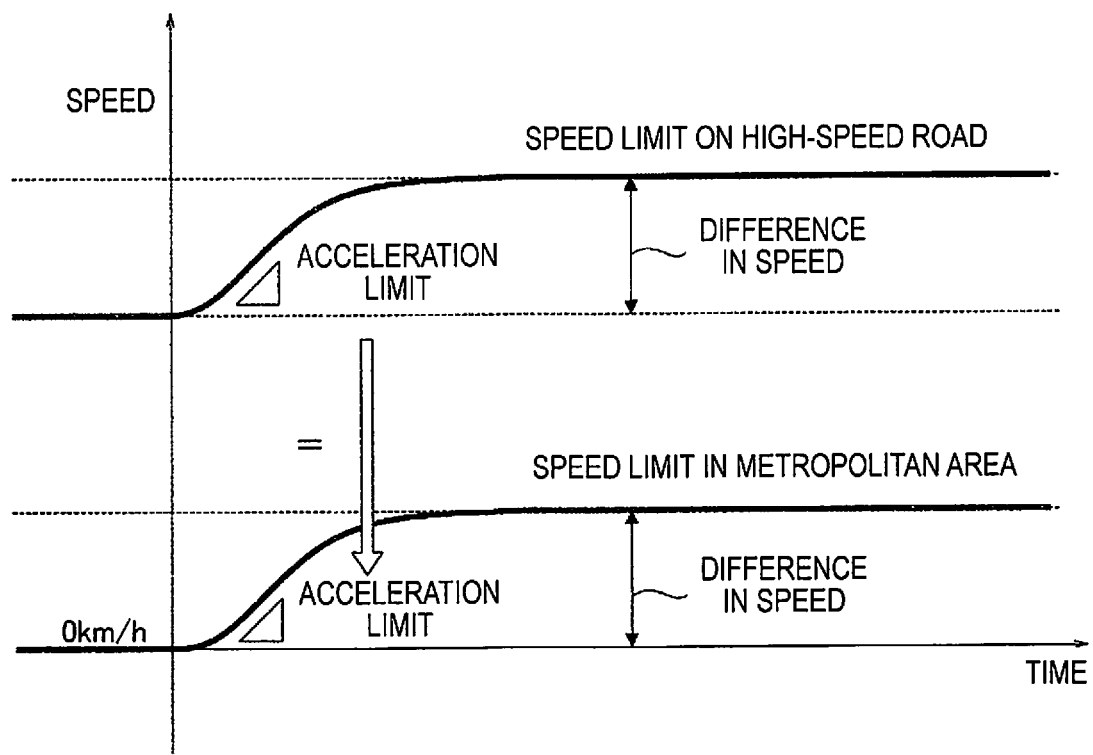
FIG. 13 is a time chart showing speed characteristics derived from acceleration during merging from a suburban road to a high-speed road, and speed characteristics derived from acceleration during setting off from a stopped state on a road in a metropolitan area, in a comparative example.

FIG. 12 shows a merge operation on a path merging from a typical road to a high-speed road, and FIG. 13 shows speed characteristics derived from acceleration during merging from a suburban road to a high-speed road, and speed characteristics derived from acceleration during setting off from a stopped state on a road in a metropolitan area, in a comparative example. A problem in the comparative example is described below on the basis of FIGS. 12 and 13.

First, in the comparative example, an acceleration limit is set in accordance with a deviation (difference in speed) between a speed limit and a host-vehicle speed.

In this comparative example, consideration is given only to the difference in speed between the speed limit and the host-vehicle speed, and not to the actual speed limit of a road on which a host vehicle is traveling. Therefore, a problem is presented in that it is difficult to achieve a suitable sense of acceleration during both travel on high-speed roads having high speed limits and travel in metropolitan areas having low speed limits.

Specifically, as shown in FIG. 13, the same acceleration (speed increase gradient) is set in cases where the differences in speed between the speed limit and the host-vehicle speed are the same. Therefore, when an acceleration suitable for travel on high-speed roads having high speed limits is set, the acceleration will be excessive during travel in metropolitan areas, and a passenger will experience unpleasant sensations and a traffic flow will be disturbed. Conversely, when an acceleration suitable for travel in metropolitan areas having low speed limits is set, the acceleration will be insufficient during travel on high-speed roads, and a passenger will experience unpleasant sensations and the traffic flow will be disturbed.

In particular, when acceleration is excessive during travel in metropolitan areas, only the host vehicle is accelerating when vehicles in the periphery of the host vehicle are traveling at a substantially constant speed, and the traffic flow in the metropolitan area is disturbed. In the case of a driving-assisted vehicle such as an autonomously driven vehicle, a passenger intends to travel along with the traffic flow and does not intend that only the host vehicle accelerates, and therefore a passenger will experience unpleasant sensations.

When acceleration is insufficient during travel on high-speed roads, during merging on a path merging from a typical road to a high-speed road as shown in FIG. 12, the host vehicle approaches at a low speed while vehicles traveling on the high-speed road are traveling at high speeds, and the host vehicle cannot merge onto the high-speed road. In the case of a driving-assisted vehicle such as an autonomous driving vehicle, a passenger intends to merge smoothly along with the traffic flow of the high-speed road and does not intend to wait in order to merge, and therefore a passenger will experience unpleasant sensations.

Operation for Acceleration Characteristic Control

Figure 14:
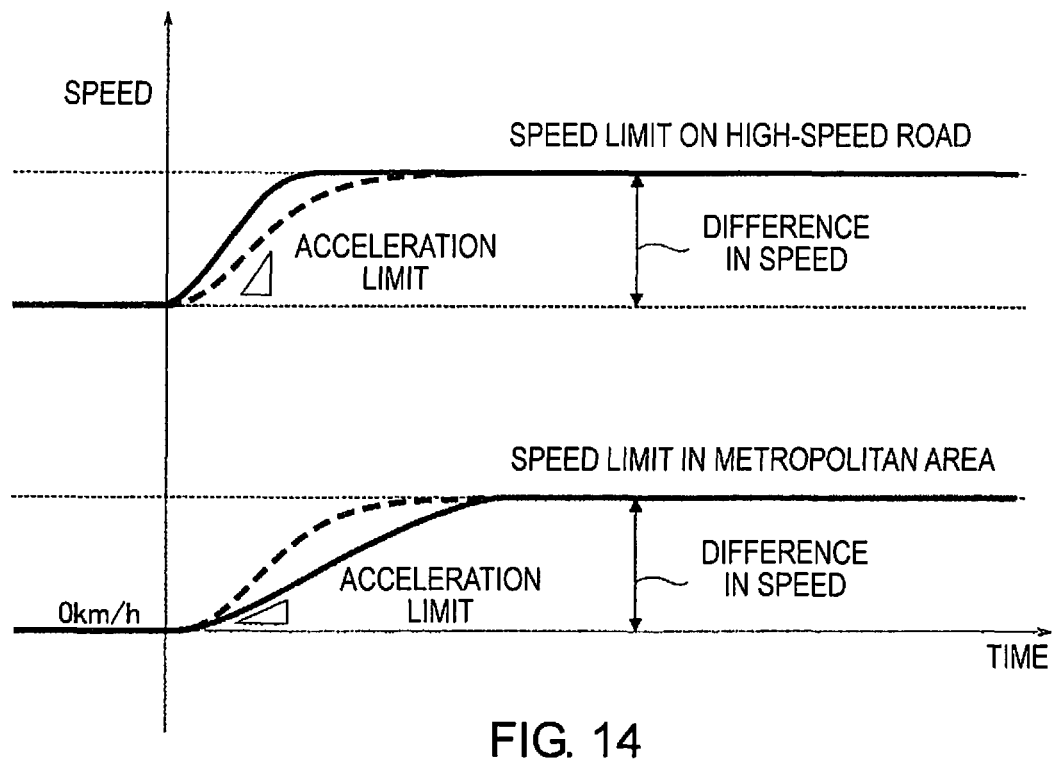
FIG. 14 is a time chart showing speed characteristics derived from acceleration during merging from a suburban road to a high-speed road, and speed characteristics derived from acceleration during setting off from a stopped state on a road in a metropolitan area, in the first embodiment.

FIG. 14 shows speed characteristics derived from acceleration during merging from a suburban road to a high-speed road, and speed characteristics derived from acceleration during setting off from a stopped state on a road in a metropolitan area, in the first embodiment. An operation for an acceleration characteristic control is described below on the basis of FIG. 14.

During merging from a suburban road to a high-speed road in the first embodiment, the limitation on acceleration is relaxed due to traveling on a high-speed road having a high speed limit. Specifically, due to the high speed limit, acceleration characteristics (speed increase gradient characteristics) are set to be sharper than in the comparative example (characteristic shown by dashed lines), as shown in an upper part of FIG. 14.

Therefore, in an approach during merging from a suburban road to a high-speed road, the speed of the host vehicle responsively rises to the speed of other vehicles traveling on the high-speed road, and the host vehicle can merge smoothly along with the traffic flow on the high-speed road. Because travel at an intermediate acceleration is achieved during merging onto the high-speed road, as intended by a passenger, a passenger will not experience unpleasant sensations.

During setting off from a stopped state on a road in a metropolitan area in the first embodiment, the limitation on acceleration is strengthened due to traveling in a metropolitan area having a low speed limit. Specifically, due to the low speed limit, acceleration characteristics (speed increase gradient characteristics) are set to be gentler than in the comparative example (characteristic shown by dashed lines), as shown in a lower part of FIG. 14.

Therefore, during setting off from a stopped state on a road in a metropolitan area, the speed of the host vehicle gradually increases, and the host vehicle can merge smoothly along with the traffic flow of peripheral vehicles that are traveling at a substantially constant speed. Because travel at a gradual acceleration for setting off is achieved during setting off on a road in a metropolitan area, as intended by a passenger, a passenger will not experience unpleasant sensations.

Operation for Deceleration Characteristic Control

Figure 15:
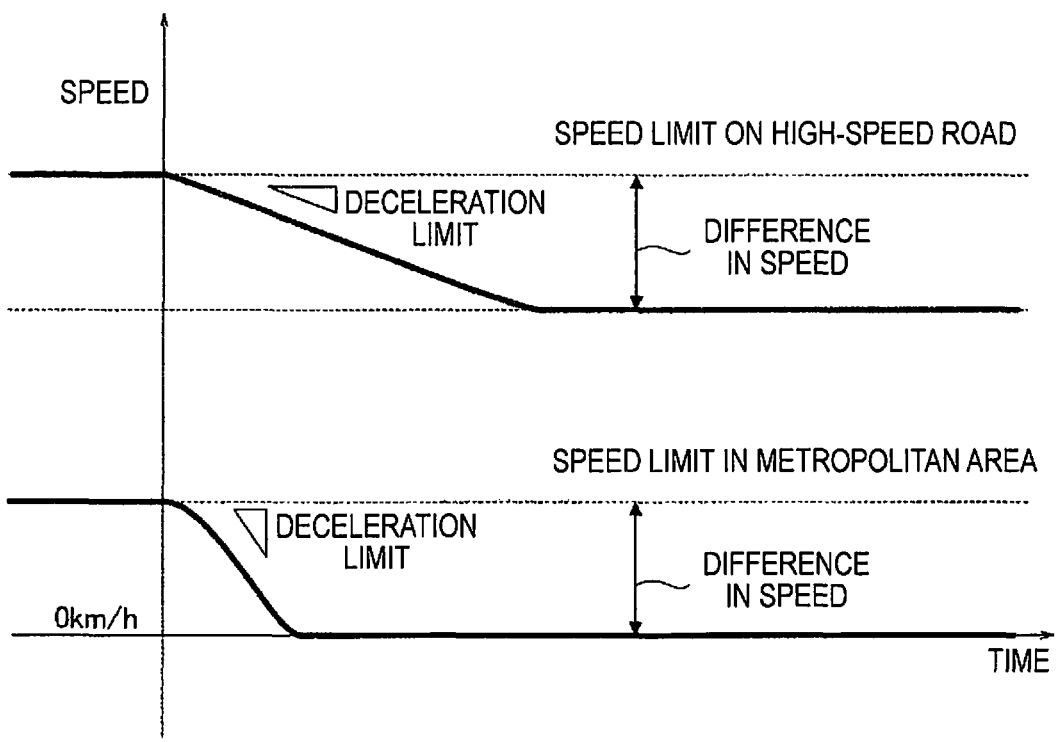
FIG. 15 is a time chart showing speed characteristics derived from deceleration during merging from a high-speed road to a suburban road, and speed characteristics derived from deceleration during stopping from low-speed travel on a road in a metropolitan area, in the first embodiment.

FIG. 15 shows speed characteristics derived from deceleration during merging from a high-speed road to a suburban road, and speed characteristics derived from deceleration during stopping from low-speed travel on a road in a metropolitan area, in the first embodiment. An operation for a deceleration characteristic control is described below on the basis of FIG. 15.

During merging from a high-speed road to a suburban road in the first embodiment, the limitation on deceleration is strengthened, opposite to that of the limitation on acceleration, due to traveling on a high-speed road having a high speed limit. Specifically, due to the high speed limit on the high-speed road, deceleration characteristics (speed decrease gradient characteristics) are set to be gentle, as shown in an upper part of FIG. 15.

Therefore, during merging from a high-speed road to a suburban road, the speed of the host vehicle gradually decreases, and the host vehicle can merge smoothly so as to follow the traffic flow of peripheral vehicles on the suburban road. Because travel at a deceleration at which the speed gradually decreases is achieved during merging from a high-speed road to a suburban road, as intended by a passenger, a passenger will not experience unpleasant sensations.

During stopping from low-speed travel on a road in a metropolitan area in the first embodiment, the limitation on deceleration is relaxed, opposite to the limitation on acceleration, due to traveling in a metropolitan area having a low speed limit. Specifically, due to the low speed limit in the metropolitan area, deceleration characteristics (speed decrease gradient characteristics) are set to be sharp, as shown in a lower part of FIG. 15.

Therefore, it is possible to decelerate quickly on roads in metropolitan areas in cases where the speed limit has decreased, and it is made easier to actively ensure safety on roads having poor visibility or on roads having low speed limits for which there is a possibility that unexpected obstacles will suddenly appear.

The effects of the invention are described next. In the method and device for generating a target vehicle speed of a driving-assisted vehicle in the first embodiment, the effects listed below are obtained.

(1) A method for generating a target vehicle speed of a driving-assisted vehicle (autonomous driving vehicle), the method involving generating a target vehicle speed of a host vehicle in accordance with a speed limit of a travel path of the host vehicle. During travel, the speed limit of the travel path of the host vehicle is acquired. A target acceleration is generated together with the generation of the target vehicle speed in accordance with the speed limit. During generation of the target acceleration, an acceleration limit value (acceleration limiter) is set so as to increase in a direction of relaxing a limitation on acceleration correspondingly with an increase in the speed limit (target vehicle speed generation unit 23; FIG. 6). Therefore, it is possible to provide a method for generating a target vehicle speed of a driving-assisted vehicle (autonomous driving vehicle) in which, during travel with driving assistance (autonomous driving), a passenger is prevented from experiencing unpleasant sensations, and disturbance of traffic flows is also prevented, in correspondence with a variety of roads having different speed limits. Specifically, because the target acceleration is generated according to the speed limit, it is possible to set acceleration characteristics that correspond to the speed limit of the road on which the host vehicle is traveling. It is also possible for the host vehicle to travel without a passenger experiencing unpleasant sensations and without disturbing the traffic flows, in correspondence with a variety of roads. Furthermore, because the acceleration limit value (acceleration limiter) is set so as to increase in a direction of relaxing the limitation on acceleration correspondingly with an increase in the speed limit, it is possible to achieve differences in sense of acceleration and ride comfort between times when the speed limit is high and times when the speed limit is low.

(2) During generation of the target acceleration, a target acceleration having an sharp gradient of vehicle speed increase is generated when the acceleration limit value (acceleration limiter) is high, and a target acceleration having a gradual gradient of vehicle speed increase is generated when the acceleration limit value (acceleration limiter) is low (speed command calculation unit 231; FIG. 14). Therefore, in addition to the effects in (1) above, it is possible to achieve both sharp acceleration for following a traffic flow during travel on a high-speed road and gradual acceleration for realizing a sense of security during travel in a metropolitan area.

(3) During generation of the target acceleration, an acceleration jerk limit value is set so as to increase in a direction of relaxing a limitation on acceleration jerk correspondingly with an increase in the speed limit (acceleration-jerk-limit-value-setting unit 231*e*; FIG. 2). Therefore, in addition to the effects in (1) and (2) above, it is possible to make a change over time in acceleration smooth and to achieve both a sense of acceleration and ride comfort by limiting acceleration jerk.

(4) During setting of the acceleration limit value, a first acceleration limit value (first acceleration limiter) is set so as to increase correspondingly with an increase in the speed limit (first acceleration limiter computation unit 231*b*), a second acceleration limit value (second acceleration limiter) is set so as to increase correspondingly with an increase in a difference in speed between the speed limit and a host-vehicle speed (second acceleration limiter computation unit 231*c*), and the lower of the first acceleration limit value and the second acceleration limit value is selected (acceleration limiter mediation unit 231*d*; FIG. 2). Therefore, in addition to the effects in (1) through (3) above, it is possible, while the host-vehicle speed is away from the speed limit, to make acceleration gradual upon approaching the speed limit while outputting an acceleration that corresponds to the speed limit.

(5) A method for generating a target vehicle speed of a driving-assisted vehicle (autonomous driving vehicle), the method involving generating a target vehicle speed of a host vehicle in accordance with a speed limit of a travel path of the host vehicle. During travel, the speed limit of the travel path of the host vehicle is acquired. A target deceleration is generated together with the generation of the target vehicle speed in accordance with the speed limit. During the generating of the target deceleration, a deceleration limit value (deceleration limiter) is set so as to increase in a direction of relaxing a limitation on deceleration correspondingly with a decrease in the speed limit (speed command calculation unit 231; FIG. 11). Therefore, it is possible to provide a method for generating a target vehicle speed of a driving-assisted vehicle (autonomous driving vehicle) in which a demand for sharp deceleration is met, and disturbance of traffic flows, in correspondence with a variety of roads having different speed limits is prevented, during travel with driving assistance (autonomous driving). Specifically, because the target deceleration is generated according to the speed limit, it is possible to set deceleration characteristics that correspond to the speed limit of the travel path of the host vehicle. It is also possible for the host vehicle to meet a demand for sharp deceleration in response to, inter alia, the sudden appearance of unexpected obstacles during travel in metropolitan areas, and to actively ensure safety. Furthermore, because the deceleration limit value (deceleration limiter) is set so as to increase in a direction of relaxing the limitation on deceleration correspondingly with a decrease in the speed limit, it is possible to achieve differences in sense of deceleration and ride comfort between times when the speed limit is high and times when the speed limit is low.

(6) During the generating of the target deceleration, a target deceleration having an sharp gradient of vehicle speed decrease is generated when the deceleration limit value (deceleration limiter) is high, and a target deceleration having a gradual gradient of vehicle speed decrease is generated when the deceleration limit value (deceleration limiter) is low (speed command calculation unit 231; FIG.

15). Therefore, in addition to the effects in (5) above, it is possible to achieve both gradual deceleration in which no unpleasant sensations are produced during travel on high-speed roads and sharp deceleration for making it easier to actively ensure safety during travel in metropolitan areas.

(7) During the generating of the target deceleration, a deceleration jerk limit value is set so as to increase in a direction of relaxing a limitation on deceleration jerk correspondingly with a decrease in the speed limit (deceleration-jerk-limit-value-setting unit 231g; FIG. 2). Therefore, in addition to the effects in (5) and (6) above, it is possible to make a change over time in deceleration smooth and to achieve both a sense of deceleration and ride comfort by limiting deceleration jerk.

(8) During acquisition of speed limit information, a default speed limit derived by recognition of a road sign is acquired as the speed limit (speed limit information acquisition unit 22; FIG. 1). Therefore, in addition to the effects in (1) through (7) above, it is possible to change acceleration characteristics and deceleration characteristics in accordance with the default speed limit disclosed on the road sign.

(9) During acquisition of speed limit information, a default speed limit derived using prior information from map data is acquired as the speed limit (speed limit information acquisition unit 22; FIG. 1). Therefore, in addition to the effects in (1) through (8) above, it is possible to change the acceleration characteristics and deceleration characteristics in accordance with the default speed limit expressed in the map data.

(10) During the acquiring of the speed limit information, when it is impossible to acquire the speed limit from road signs or from the map data, a speed determined as a speed at which it is possible to travel without significantly departing from the traffic flow, on the basis of traffic flow information estimated from a plurality of items of peripheral vehicle position information obtained from onboard sensors, is acquired as the speed limit (speed limit information acquisition unit 22; FIG. 1). Therefore, in addition to the effects in (1) through (9) above, it is possible to acquire the speed limit on the basis of the traffic flow information when it is impossible to acquire the speed limit from road signs or from the map data.

(11) During the acquiring of the speed limit information, when a plurality of speed limits are acquired, the lowest value of the plurality of speed limits is selected as the speed limit (speed limit information acquisition unit 22: FIG. 1). Therefore, in addition to the effects in (1) through (9) above, it is possible to select a speed limit at which safer travel is ensured from among a plurality of speed limits.

(12) A device for generating a target vehicle speed of a driving-assisted vehicle equipped with a controller (autonomous driving control unit 2) for generating a target vehicle speed of a host vehicle in accordance with a speed limit of a travel path of the host vehicle, wherein the controller (autonomous driving control unit 2) comprises a speed limit information acquisition unit 22 and a target vehicle speed generation unit 23. During travel, the speed limit information acquisition unit 22 acquires the speed limit of the travel path of the host vehicle. The target vehicle speed generation unit 23 generates a target acceleration together with the generation of the target vehicle speed in accordance with the speed limit and, during generation of the target acceleration, sets an acceleration limit value to increase in a direction of relaxing a limitation on acceleration correspondingly with an increase in the speed limit (FIG. 1). Therefore, it is possible to provide a device for generating a target vehicle speed of a driving-assisted vehicle (autonomous driving vehicle) in which, during travel with driving assistance (autonomous driving), a passenger is prevented from feeling unpleasant sensations, and disturbance of traffic flows is also prevented, in correspondence with a variety of roads having different speed limits.

In the foregoing, a method and device for generating a target vehicle speed of a driving-assisted vehicle of the present disclosure were described with reference to the first embodiment. However, the specific configuration thereof is not limited to that of the first embodiment; modifications to the design, additions, etc., are possible without departing from the spirit of the invention as set forth in the accompanying claims.

In the first embodiment, the speed limit information acquisition unit 22 was described as acquiring the speed limit information from road signs, map data, and a traffic flow surrounding the host vehicle. However, another example of the speed limit information acquisition unit acquires, according to infrastructure information related to traffic, speed limit information when the speed limit is temporarily changed due to weather, etc.

In the first embodiment, an example was cited in which pre-limitation target acceleration characteristics and target deceleration characteristics are subjected to limiter computation processing in accordance with the speed limit, whereby the acceleration limit value and/or the deceleration limit value are obtained. However, a configuration may also be adopted in which, for example, pre-limitation target acceleration characteristics and target deceleration characteristics are filtered using a filter that corresponds to a speed limit to thereby obtain an acceleration limit value and/or a deceleration limit value.

In the first embodiment, the method and device for generating a target vehicle speed according to the present disclosure are applied to an autonomous driving vehicle in which steering/drive/braking are autonomously controlled through selection of an autonomous driving mode. However, the method and device for generating a target vehicle speed according to the present disclosure can also be applied to vehicles in which a target vehicle speed is used to support driving of a driver, such as a driving-assisted vehicle that supports driving of a driver by displaying a target vehicle speed, or a driving-assisted vehicle equipped only with an ACC.

The invention claimed is:

1. A target vehicle speed generation method for generating a target vehicle speed of a host vehicle in accordance with a speed limit of a travel path of the host vehicle, the target vehicle speed generation method comprising:
   acquiring the speed limit of the travel path of the host vehicle during travel;
   generating a target acceleration in accordance with the speed limit; and
   limiting the target acceleration so as not to exceed an acceleration limit value,
   the acceleration limit value being set by setting a first acceleration limit value that is increased correspondingly with an increase in the speed limit, setting a second acceleration limit value that is increased correspondingly with an increase in a difference in speed between the speed limit and a host-vehicle speed, and selecting the lower of the first acceleration limit value and the second acceleration limit value as the acceleration limit value.

2. The target vehicle speed generation method according to claim 1, wherein during the generating of the target acceleration, the limitation on acceleration is relaxed correspondingly with an increase in the speed limit of the travel path of the host vehicle.

3. The target vehicle speed generation method according to claim 2, wherein
during the generating of the target acceleration, an acceleration jerk limit value is set to be increased in a direction of relaxing a limitation on acceleration jerk correspondingly with an increase in the speed limit of the travel path of the host vehicle.

4. The target vehicle speed generation method according to claim 2, further comprising
generating a target deceleration in accordance with the speed limit; and
limiting the target deceleration so as not to exceed a deceleration limit value,
the deceleration limit value being set to increase as the speed limit of the travel path of the host vehicle decreases and decrease as the speed limit of the travel path of the host vehicle increases.

5. The target vehicle speed generation method according to claim 1, wherein
during the generating of the target acceleration, an acceleration jerk limit value is set to be increased in a direction of relaxing a limitation on acceleration jerk correspondingly with an increase in the speed limit of the travel path of the host vehicle.

6. The target vehicle speed generation method according to claim 1, further comprising
generating a target deceleration in accordance with the speed limit; and
limiting the target deceleration so as not to exceed a deceleration limit value,
the deceleration limit value being set to increase as the speed limit of the travel path of the host vehicle decreases and decrease as the speed limit of the travel path of the host vehicle increases.

7. The target vehicle speed generation method according to claim 6, wherein
during the generating of the target deceleration the limitation on deceleration is relaxed correspondingly with a decrease in the speed limit of the travel path of the host vehicle.

8. The target vehicle speed generation method according to claim 6, wherein
the target deceleration is increased when the deceleration limit value is increased, and the target deceleration is decreased when the deceleration limit value is decreased.

9. The target vehicle speed generation method according to claim 6, wherein
during the generating of the target deceleration, a deceleration jerk limit value is set to be increased in a direction of relaxing a limitation on deceleration jerk correspondingly with a decrease in the speed limit of the travel path of the host vehicle.

10. The target vehicle speed generation method according to claim 1, wherein
the target acceleration is increased when the acceleration limit value is increased, and the target acceleration is decreased when the acceleration limit value is decreased.

11. The target vehicle speed generation method according to claim 1, wherein
during the acquiring of the speed limit of the travel path of the host vehicle, when it is impossible to acquire the speed limit from road signs or from map data during travel, the speed limit is determined on the basis of traffic flow information estimated from a plurality of items of peripheral vehicle position information obtained from onboard sensors.

12. The target vehicle speed generation method according to claim 11, wherein
during the acquiring of the speed limit of the travel path of the host vehicle, when a plurality of speed limits are acquired during travel, the lowest value of the plurality of speed limits is selected as the speed limit of the travel path of the host vehicle.

13. The target vehicle speed generation method according to claim 12, wherein
the plurality of speed limits includes a default speed limit derived by recognition of a road sign acquired during travel.

14. The target vehicle speed generation method according to claim 13, wherein
the plurality of speed limits further includes another default speed limit derived using prior information from map data acquired during travel.

15. The target vehicle speed generation method according to claim 12, wherein
the plurality of speed limits includes a default speed limit derived using prior information from map data acquired during travel.

16. The target vehicle speed generation method according to claim 1, wherein
during the acquiring of the speed limit of the travel path of the host vehicle, when a plurality of speed limits are acquired during travel, the lowest value of the plurality of speed limits is selected as the speed limit of the travel path of the host vehicle.

17. The target vehicle speed generation method according to claim 16, wherein
the plurality of speed limits further includes a default speed limit derived by recognition of a road sign acquired during travel.

18. The target vehicle speed generation method according to claim 17, wherein
the plurality of speed limits further includes another default speed limit derived using prior information from map data acquired during travel.

19. The target vehicle speed generation method according to claim 16, wherein
the plurality of speed limits includes a default speed limit derived using prior information from map data acquired during travel.

20. A device for generating a target vehicle speed of a driving-assisted host vehicle, the device comprising:
a controller that generates a target vehicle speed of the host vehicle in accordance with a speed limit of a travel path of the host vehicle,
the controller being configured to
acquire the speed limit of the travel path of the host vehicle during travel, generate a target acceleration in accordance with the speed limit, and
limit the target acceleration so as not to exceed an acceleration limit value,
the controller setting the acceleration limit by setting a first acceleration limit value that is increased correspondingly with an increase in the speed limit, setting a second acceleration limit value that is increased correspondingly with an increase in a difference in speed between the speed limit and a host-vehicle speed, and selecting the lower of the first acceleration limit value and the second acceleration limit value as the acceleration limit value.

\* \* \* \* \*